United States Patent Office 2,864,862
Patented Dec. 16, 1958

2,864,862

METHYLOLACRYLAMIDE

George Leslie Sutherland and Gustave Gerald Desy, Stamford, Conn., assignors to American Cyanamid Company, New York, N. Y., a corporation of Maine No Drawing. Application August 30, 1956
Serial No. 606,983

2 Claims. (Cl. 260—561)

This invention relates to methylol derivatives of unsaturated, polymerizable, low melting amides. More particularly, it relates to the preparation of such methylol derivatives, especially methylolacrylamide. Still more particularly, it relates to the preparation of methylolacrylamide as a substantially pure crystalline monomer by the fusion of solid acrylamide and paraformaldehyde.

Various unsaturated organic amides have become of increased importance in various fields in recent years. Among these is methylolacrylamide and its polymerization and co-polymerization products. These products have been shown to be potentially useful in various fields such as those of adhesives, fibers, surface coatings, paper, textiles, and the like.

Methylolacrylamide is prepared by reacting acrylamide with formaldehyde and can be recovered as an aqueous solution or as a crystalline solid. From the viewpoint of transportation, stability and ease of handling in industrial use, as well as from the superior polymerization results obtained, methylolacrylamide in solid, crystalline form is to be preferred to an aqueous solution thereof. Methods of producing methylolacrylamide in pure, solid form are, therefore, of industrial importance. It has been proposed to prepare solid methylolacrylamide by fusing crystalline acrylamide and paraformaldehyde in the presence of a catalyst such as triethylamine, diethylethanolamine, morpholine or the like. On being heated to the melting point of acrylamide or even at temperatures considerably below the melting point, the mixture liquifies and then resolidifies as methylolacrylamide.

This solid phase reaction of acrylamide and paraformaldehyde, however, does not always proceed in the desired manner. Very poor reproducibility of results has been observed, for instance, when using acrylamide samples from different batches and even when using samples from the same batch, particularly when the acrylamide is of production grade. Under normal conditions when operating at about 50° C., the mixture of acrylamide and paraformaldehyde should liquify in about 30 minutes and slowly solidify as methylolacrylamide in about an additional 90 minutes. It has not been uncommon, however, for the mixture to fail to liquify even after as long as five hours. This failure to produce methylolacrylamide in consistently reasonable reaction periods obviously is a serious drawback.

It has now been discovered, in accordance with this invention, that the preparation of methylolacrylamide by the fusion of acrylamide with paraformaldehyde can be surprisingly conducted in a substantially more uniform period of time regardless of the source of acrylamide by neutralizing the small amount of acidic material normally present therein. The presence of such acidic material, possibly acrylic acid, apparently prevents the alkaline catalyst from acting. At any rate, on neutralization with a strong base, the reaction proceeds normally after the addition of the catalyst.

The amount of strong base employed will generally be molecularly equivalent to the acid present, although a mol ratio of base to acid of as low as 0.7 has been shown to result in a successful reaction. The use of base: acid mol ratios greater than one have no adverse effect on the subsequent fusion reaction, it being desirable, moreover, to use a slight stoichiometric excess of base.

The neutralizing base employed should be a strong base, for instance, sodium hydroxide, sodium carbonate or the like as compared to weak bases which are not effective. Thus, when thiethylamine, a preferred alkaline catalyst, is employed also as the neutralizing base even in base:acid mol ratios as great as 10:1, a successful reaction period has not always been observed.

The amount of base employed also varies to some extent with the acid number of the acrylamide employed. The acid number in accordance with this invention is defined as the number of milligrams of potassium hydroxide required to adjust the hydrogen ion concentration of 1 gram of acrylamide as an aqueous solution to a preselected pH. As the acid number increases, the neutralizing base:acid mol ratio required to produce optimum results tends to increase.

The time at which the neutralizing base is added to the acrylamide may be varied. It may be completely added before starting the reaction or it may be added as the reaction proceeds. The manner of addition may also take various forms such as addition as a finely divided solid or as a solution. Regardless of the time and manner of addition, neutralization as well as the fusion reaction are conducted with agitation of sufficient intensity to obtain intimate contact.

Any of triethylamine, tri-n-propylamine, tri-n-butylamine, morpholine, diisobutylamine, diethylethanolamine, barium oxide, sodium borate, trisodiumphosphate, and the like either alone or in combination have been found useful as alkaline catalysts. Trialkylamines, however, especially triethylamine, have been found particularly effective. Varying amounts of catalyst have been found useful. In general, as little as 0.5% by weight of the acrylamide will be effective, although as much as 1.5% and even more may be employed. More than about 1.5%, however, provides for little if any added advantage. Preferably, therefore, from about 0.5–1.0% on the weight of the acrylamide will be used. If desirable, a polymerization inhibitor such as sodium nitrite may be incorporated in the mixture although there is little evidence of polymerization in its absence provided an elevated temperature is not maintained for too long a period of time.

The following examples further illustrate the invention. All parts are by weight unless otherwise noted.

EXAMPLE 1

A series of runs are conducted in each of which acrylamide and paraformaldehyde are charged to a mixer provided with a jacket having water at 50° C. circulating therethrough. The different grades of acrylamide employed are indicated in Table I by the acid number. The table also shows the amounts of neutralizing base and catalyst employed. Where a neutralizing base is used, it is added with stirring after which the catalyst is added. Whether or not a neutralizing base is used, the mixture is stirred after addition of the catalyst and the temperature maintained at about 50° C. while the reaction is observed for liquification and subsequent solidification. Results appear in Table I.

Table I

| Run No | 1 | 2 | 3 | 4 | 5 | 6 | 7 |
|---|---|---|---|---|---|---|---|
| Acrylamide: | | | | | | | |
| mol | 3 | 2 | 192 | 192 | 4 | 4 | 4 |
| acid no | 1.8 | 4.5 | 4.5 | 4.5 | 1.8 | 4.5 | 3.1 |
| Paraformaldehyde (mol) | 3.1 | 2.06 | 198 | 198 | 4.1 | 4.1 | 4.1 |
| Na$_2$CO$_3$/acid (mol) | 0.0 | 0.0 | 0.0 | 0.0 | 0.8 | 1.0 | 1.0 |
| Triethylamine (ml.) | 6 | 2.5 | 144 | 144 | 3 | 3 | 3 |
| Liquification time (hr.) | >1 | >2 | >5 | >5 | 0.4 | 1 | 1 |
| Solidification time (hr.) | | | | | 1 | 2 | 2 |

EXAMPLE 2

192 mols of acrylamide having an acid number of 4.5, 198 mols of paraformaldehyde and sufficient $Na_2CO_3$ to provide an $Na_2CO_3$/acid mol ratio of 1:1 are charged to a Readco mixer maintained at 50° C. and stirred for 5 minutes. 144 ml. of triethylamine are then added and stirring continued. Liquification occurs in two hours and solidification in three hours. Yield of methylolacrylamide based on the paraformaldehyde used up was 89%.

EXAMPLE 3

The procedure of Example 2 is repeated except that the acid number of the acrylamide is 3.1. Liquification occurs in one hour and solidification in three hours. Yield of methylolacrylamide based on the paraformaldehyde used up was 92%.

We claim:

1. In the fusion method of preparing substantially pure crystalline methylolacrylamide by dry-mixing crystalline acrylamide and paraformaldehyde in the presence of a catalytic amount of a base unreactive in the mixture wherein the fusion reaction is inhibited, the improvement which comprises: neutralizing the acid content of the acrylamide with a strong base.

2. A method according to claim 1 in which the base is added to the mixture of acrylamide and paraformaldehyde before the addition of the catalytic base in amount sufficient to provide a mol ratio with the acid content of at least 0.7.

References Cited in the file of this patent

UNITED STATES PATENTS

| | | |
|---|---|---|
| 2,096,181 | Johrstorfer et al. | Oct. 19, 1937 |
| 2,268,395 | Henke et al. | Dec. 30, 1941 |
| 2,475,846 | Lundberg | July 12, 1949 |
| 2,713,594 | Sauer | July 19, 1955 |
| 2,760,977 | Feuer et al. | Aug. 28, 1956 |